(12) United States Patent
Yoon

(10) Patent No.: US 10,826,427 B2
(45) Date of Patent: Nov. 3, 2020

(54) DE-ICING DEVICE FOR SOLAR PANEL AND METHOD OF OPERATING THE SAME

(71) Applicant: SOLASIDO KOREA CO.,LTD., Jeonju-si (KR)

(72) Inventor: Chang Bok Yoon, Jeonju-si (KR)

(73) Assignee: SOLASIDO KOREA CO., LTD., Jeonju-si (KR)

( * ) Notice: Subject to any disclaimer, the term of this patent is extended or adjusted under 35 U.S.C. 154(b) by 409 days.

(21) Appl. No.: 15/807,416

(22) Filed: Nov. 8, 2017

(65) Prior Publication Data

US 2019/0089296 A1 Mar. 21, 2019

(30) Foreign Application Priority Data

Sep. 19, 2017 (KR) .................. 10-2017-0120582

(51) Int. Cl.
*H02S 40/12* (2014.01)
*H02S 40/44* (2014.01)
*F24S 40/20* (2018.01)
*F24S 40/70* (2018.01)
*H02S 50/00* (2014.01)

(52) U.S. Cl.
CPC .............. *H02S 40/12* (2014.12); *F24S 40/20* (2018.05); *F24S 40/70* (2018.05); *H02S 40/44* (2014.12); *H02S 50/00* (2013.01)

(58) Field of Classification Search
CPC .......... H02S 40/12; H02S 40/10; H02S 40/30; H02S 40/32; H02S 40/38; H02S 40/44; H02S 50/00; F24S 40/20; F24S 40/70
See application file for complete search history.

(56) References Cited

U.S. PATENT DOCUMENTS

| 9,443,638 | B2 | 9/2016 | Chow et al. |
| 2013/0209776 | A1 | 8/2013 | Kim |
| 2014/0166044 | A1* | 6/2014 | Klier .................. F24S 40/20 134/1 |
| 2015/0096616 | A1 | 4/2015 | Yokoyama |
| 2016/0009934 | A1 | 1/2016 | Han et al. |

FOREIGN PATENT DOCUMENTS

| JP | 60-235442 | * 11/1985 |
| JP | 08250756 B2 | 9/1996 |
| JP | 14026356 A | 1/2002 |
| KR | 10-2010-0032811 A | 3/2010 |
| KR | 10-1020751 B1 | 3/2011 |
| KR | 10-2012-0137939 A | 12/2012 |

* cited by examiner

*Primary Examiner* — Shawntina T Fuqua
(74) *Attorney, Agent, or Firm* — Goldilocks ZONE IP Law

(57) ABSTRACT

Disclosed are a de-icing device for a solar panel and a method of operating the same. The de-icing device for the solar panel and the method of operating the same include a sensor unit, a power supply unit, a switching unit, and a control unit, so that it is possible to provide a high-efficiency de-icing device for the solar panel in which snow deposited on the solar penal may be dissolved by applying a reverse current to the solar panel. In addition, it is possible to provide a high-efficiency and high-precision de-icing device for the solar panel in which solar power generation and de-icing may be simultaneously performed and the amount of the reverse current may be controlled.

16 Claims, 4 Drawing Sheets

DE-ICING DEVICE FOR SOLAR PANEL AND METHOD OF OPERATING THE SAME

CLAIM FOR PRIORITY

This application claims priority to Korean Patent Application No. 2017-0120582 filed on Sep. 19, 2017 in the Korean Intellectual Property Office (KIPO), the entire contents of which are hereby incorporated by reference.

BACKGROUND

1. Technical Field

Example embodiments of the present invention relate in general to a de-icing device for a solar panel and a method of operating the same, and more particularly to a de-icing device for a solar panel which may remove snow deposited on the solar panel and a method of operating the same.

2. Related Art

In recent years, interest in eco-friendly energy, that is, new renewable energy has been increasing due to accelerated global warming and limited resources. In regard this, photovoltaic (PV) systems with no fuel, no pollution, noise-free, and no-vibration characteristics are easy to be expanded, have semi-permanent use, and have low maintenance costs.

Above all, the PV system has excellent connectivity with existing power facilities and stably produces high-quality electric power through real-time monitoring of the system, so that the demand for the PV system is increasing day by day.

On the other hand, the PV system is installed in a state of being exposed to the outside, which is very vulnerable to natural disasters. For example, there is a risk that a solar panel will collapse due to snowfall exceeding a proper load. This causes injury/loss of life and property damage, so research on the development of a de-icing device for a solar panel is required.

Conventionally, there is a de-icing device using a wiper as a conventional de-icing device for a solar panel. However, when the snow deposited on the solar panel is frozen, the operation of the wiper may be interrupted or the wiper may be damaged.

Accordingly, there is a demand for a de-icing device for a solar panel capable of automatically performing a de-icing function by determining whether snow is deposited on the solar panel.

SUMMARY

Accordingly, example embodiments of the present invention are provided to substantially obviate one or more problems due to limitations and disadvantages of the related art.

Example embodiments of the present invention provide a high-efficiency de-icing device for a solar panel and a method of operating the same.

Example embodiments of the present invention also provide a high-performance de-icing device for a solar panel and a method of operating the same.

Example embodiments of the present invention also provide a high-safety de-icing device for a solar panel and a method of operating the same.

Example embodiments of the present invention also provide a low-cost de-icing device for a solar panel and a method of operating the same.

In some example embodiments, a de-icing device for a solar panel which is used for a photovoltaic (PV) system and includes a plurality of strings ranging from a first row to an N-th row, includes: a sensor unit that determines whether snow is deposited on the solar panel; a power supply unit that discharges a reverse current to the solar panel; a switching unit that is positioned between the solar panel and the power supply unit and controls application of the reverse current to the solar panel; and a control unit that controls opening and closing of the switching unit according to whether data measured by the sensor unit satisfies a threshold condition.

Here, the sensor unit may include a temperature sensor that includes a first temperature sensor disposed in a periphery of the solar panel to measure an ambient atmospheric temperature and a second temperature sensor disposed on the solar panel to measure a temperature of the solar panel, an illuminance sensor that is disposed on the solar panel and determines a sunset time point according to an amount of light, and a current sensor that is connected to the power supply unit and measures an amount of a generated current of the solar panel in real time.

Also, the amount of the generated current of the solar panel may be smaller than an amount of the reverse current that is discharged from the power supply unit and is introduced into the plurality of strings ranging from the first row to the N-th row.

Also, when the amount of the generated current measured by the current sensor is equal to or larger than a first threshold value, the temperature measured by each of the first temperature sensor and the second temperature sensor is a sub-zero value, and data measured by the illuminance sensor is a positive (+) value, de-icing may be performed.

Also, a plurality of switching units may be provided and may be respectively connected to one end of the plurality of strings.

Also, the switching unit may include a first switch and a second switch, and the second switch may be connected to a contact between a first line in which the strings of even-numbered rows are grouped and a second line in which the strings of odd-numbered rows are grouped and may be positioned closer to the solar panel than the first switch.

Also, the first switch may be an open/close type switch, and the second switch may be a toggle type switch.

Also, the power supply unit may further include a battery that stores and discharges a current, and a conversion unit that converts, when the reverse current discharged from the battery is an alternating current (AC), the AC into a direct current (DC).

Also, the switching units connected to the plurality of strings ranging from the first row to the N-th row may be sequentially operated in a forward direction or a reverse direction.

Also, the control unit may include a first control unit that determines whether the data measured by the sensor unit satisfies the threshold condition, a second control unit that controls the opening and closing of the switching unit, a third control unit that monitors the amount of the reverse current discharged from the power supply unit in real time, and a fourth control unit that stops the PV system when data measured by the illuminance sensor is less than a second threshold value.

Also, the first control unit may adjust an amount of the reverse current discharged from the power supply unit.

In other example embodiments, a method of operating a de-icing device for a solar panel which includes at least one sensor unit and removes snow deposited on the solar panel used for a PV system, includes: determining whether snow is deposited on the solar panel; and de-icing for the solar panel in response to the determining, when the snow is deposited on the solar panel.

Here, the sensor unit may include a temperature sensor that includes a first temperature sensor disposed in a periphery of the solar panel to measure an ambient atmospheric temperature and a second temperature sensor disposed on the solar panel to measure a temperature of the solar panel, an illuminance sensor that is disposed on the solar panel and determines a sunset time point according to an amount of light, and a current sensor that is connected to the power supply unit and measures an amount of a generated current of the solar panel in real time.

Also, the solar panel may include a plurality of strings ranging from a first row to an N-th row.

Also, the determining of whether snow is deposited on the solar panel may include determining whether snow is deposited on the solar panel according to whether data measured by the sensor unit satisfies a threshold condition.

Also, the threshold condition may be characterized that data measured by the current sensor is equal to or larger than a first threshold value, the temperature measured by each of the first temperature sensor and the second temperature sensor is a sub-zero value, and data measured by the illuminance sensor is a positive (+) value.

Also, the performing of de-icing for the solar panel may include selecting, by a user, a control type of the switching unit when the data measured by the sensor unit satisfies the threshold condition, and discharging a reverse current according to the selected control type of the switching unit.

Also, when the amount of the generated current of the solar panel measured by the current sensor is larger than a sum of amounts of reverse currents respectively applied to the plurality of strings of the solar panel, de-icing for the solar panel may be terminated regardless of a corresponding operation step.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
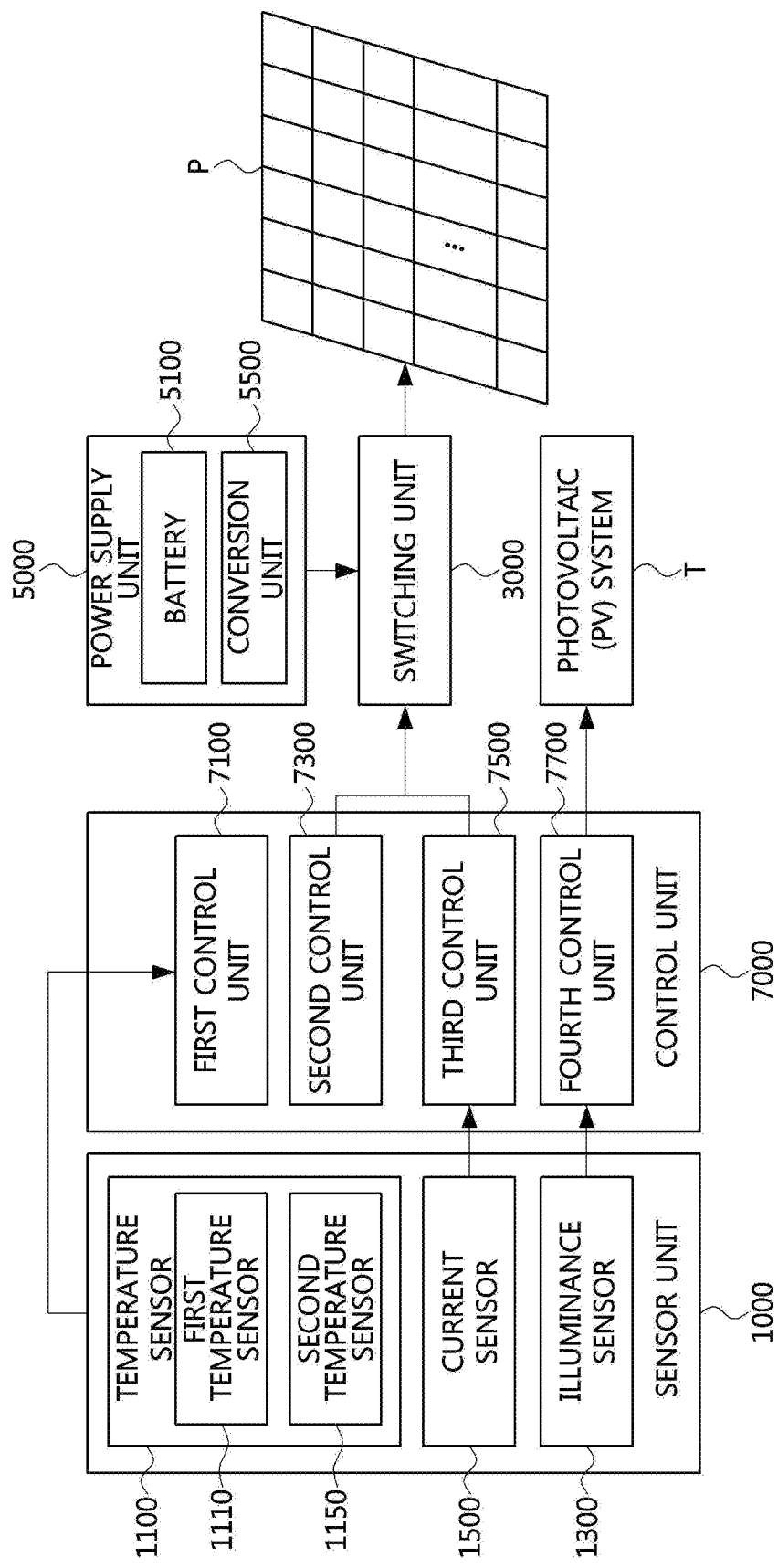
FIG. 1 is a conceptual diagram illustrating components of a de-icing device for a solar panel according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments according to the present invention will be described in detail with reference to the accompanying drawings.

Figure 2:
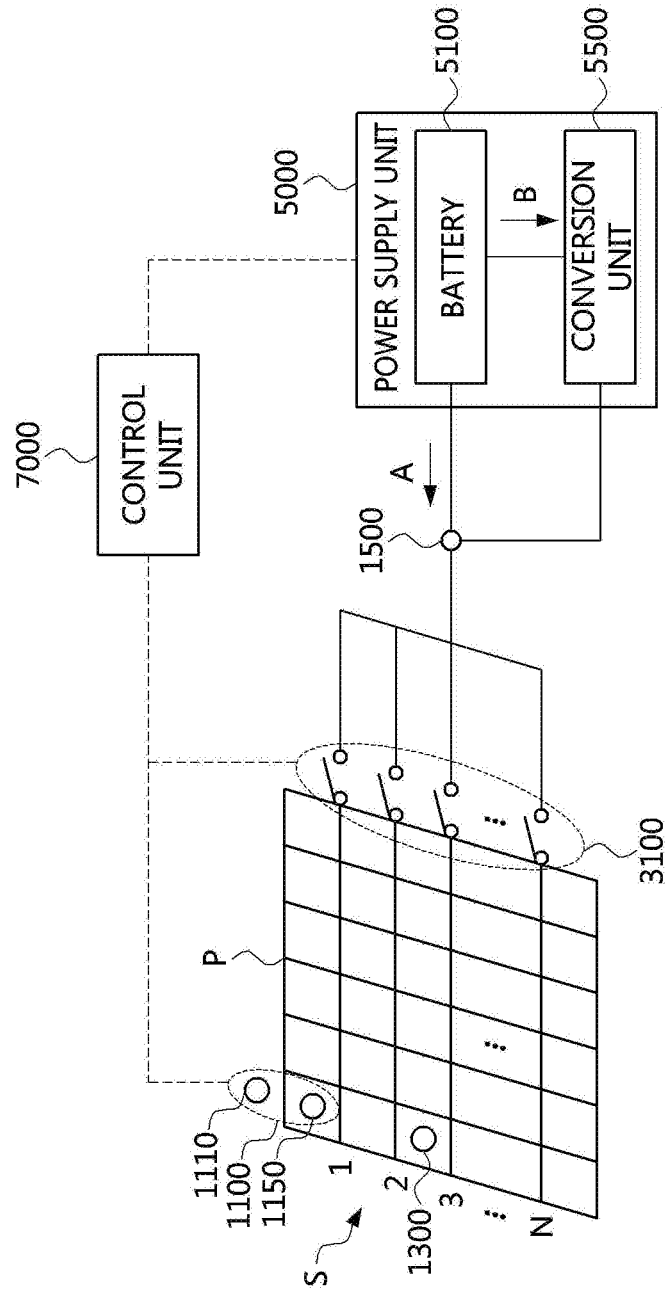
FIG. 2 is a diagram illustrating a switching unit of a de-icing device for a solar panel according to an embodiment of the present invention.
Figure 3:
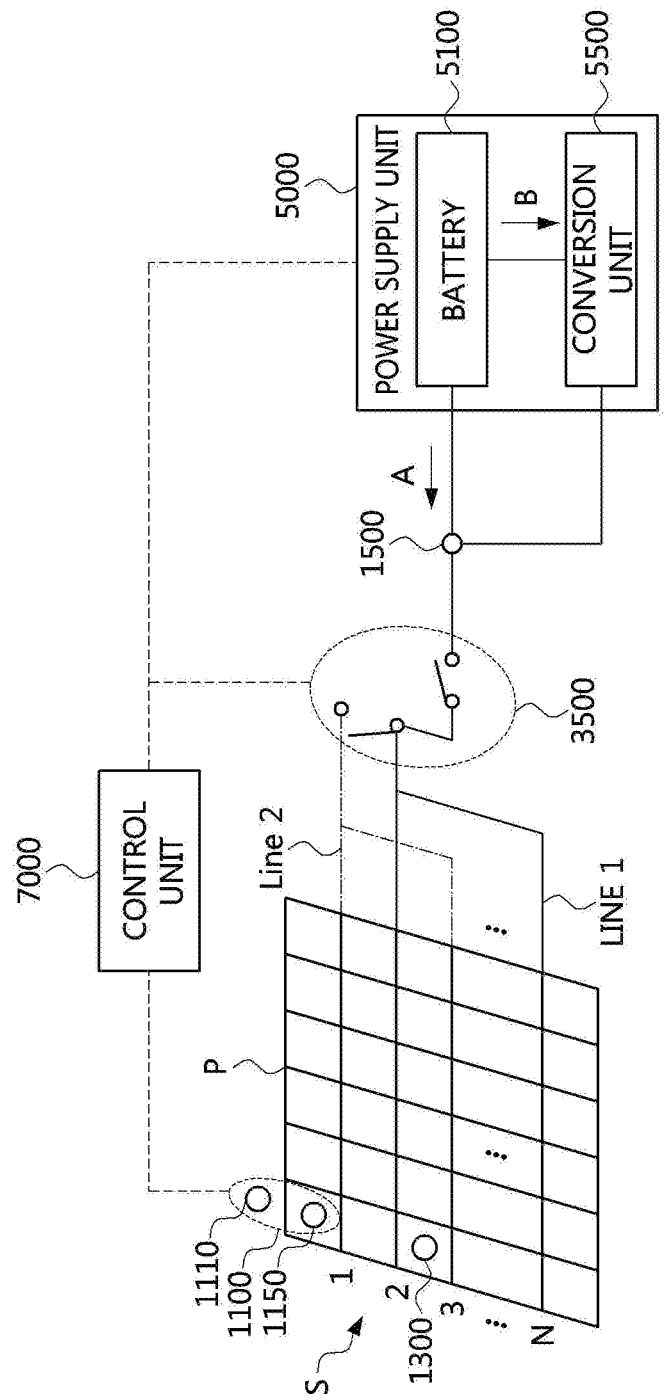
FIG. 3 is a flowchart illustrating a switching unit of a de-icing device for a solar panel according to another embodiment of the present invention.

FIGS. 1 to 3 are conceptual diagrams illustrating a de-icing device for a solar panel according to an embodiment of the present invention. More specifically, FIG. 1 is a conceptual diagram illustrating components of a de-icing device for a solar panel according to an embodiment of the present invention, and FIGS. 2 and 3 are circuit diagrams illustrating a de-icing device coupled to a solar panel. Here, FIG. 2 is a circuit diagram illustrating a switching unit according to an embodiment, and FIG. 3 is a circuit diagram illustrating a switching unit according to another embodiment.

Referring to FIGS. 1 to 3, a de-icing device for a solar panel according to an embodiment of the present invention may be installed in a photovoltaic (PV) system T including a plurality of strings ranging from a first row to an N-th row.

The de-icing device for the solar panel may include a sensor unit 1000, a switching unit 3000, a power supply unit 5000, and a control unit 7000.

The sensor unit 1000 may be a component for controlling a de-icing operation of the control unit 7000 to be described later. In other words, the sensor unit 1000 may be used to determine whether snow is deposited on the solar panel by a first control unit 7100 to be described later.

The control of the de-icing operation of the control unit 7000 by the sensor unit 1000 will be described in more detail in the description of a method of operating the de-icing device to be described later.

The sensor unit 1000 may include a temperature sensor 1100, an illuminance sensor 1300, and a current sensor 1500.

The temperature sensor 1100 may include a first temperature sensor 1110 and a second temperature sensor 1150. The first temperature sensor 1110 may be disposed in a periphery of a solar panel P to measure an atmospheric temperature. The second temperature sensor 1150 may be disposed on the solar panel P to measure a temperature of the solar panel P.

Accordingly, the de-icing device for the solar panel according to an embodiment of the present invention may consider not only the solar panel P but also the temperature of the periphery of the solar panel P, so that the control unit 7000 to be described later may more sensitively adjust an amount of a reverse current discharged from the power supply unit 5000 to be described later for dissolving snow.

The illuminance sensor 1300 may be disposed on the solar panel. The illuminance sensor 1300 may determine whether snow is deposited with measurement data of the first and second temperature sensors 1110 and 1150. A method of determining whether snow is deposited using the temperature sensor 1100 and the illuminance sensor 1300 will be described in more detail in the description of the first control unit 7100 to be described later.

In addition, the illuminance sensor 1300 may determine a sunset time point and enable an efficient operation of the PV system T in the winter season with short daytime. The determination of the sunset time point of the illuminance sensor 1300 will be described in more detail in the description of a fourth control unit 7700 to be described later.

The current sensor 1500 is connected to the power supply unit 5000 to be described later, and can measure an amount of a generated current of the solar panel in real time. As described above, current data measured by the current sensor 1500 may be transmitted to the control unit 7000 to be described later.

The switching unit 3000 is disposed between the solar panel and the power supply unit 5000 to be described later, and may control the reverse current discharged from the power supply unit 5000 to be described later to the solar panel.

According to an embodiment, as shown in FIG. 2, a plurality of switching units 3000 are provided to be respectively connected to one end of a plurality of strings S of the solar panel P. Accordingly, the switching unit 3000 may individually control the reverse currents introduced into the strings S of the solar panel P by a second control unit 7300 to be described later.

For example, the switching unit 3000 may sequentially open the switching units 3000 connected to the strings S ranging from the first row to the N-th row in a forward direction or a reverse direction by the second control unit 7300.

According to another embodiment, as shown in FIG. 3, the switching unit 3000 may include a first switch 3100 and a second switch 3500. The second switch 3500 may be connected to a contact between a first line (Line 1) in which even-numbered columns are grouped among the plurality of strings S and a second line (Line 2) in which odd-numbered columns are grouped among the plurality of strings S.

The first switch 3100 and the second switch 3500 may be controlled to be opened or closed by the second control unit 7300. For example, the first switch 3100 may be an open/close type switch, and the second switch 3500 may be a toggle type switch.

More specifically, the first switch 3100 may control an inflow of the reverse current to the solar panel P side by the second control unit 7300.

The second switch 3500 may be disposed closer to the solar panel P than the first switch 3100. Thus, depending on whether the first switch 3100 is opened or closed, whether the reverse current is introduced to the second switch 3500 may be determined.

According to an embodiment, when the first switch 3100 is closed, the second switch 3500 may control the flow of the introduced reverse current to the first line (Line 1) or the second line (Line 2) by opening and closing of the second control unit 7300.

The power supply unit 5000 may transmit the reverse current to the solar panel P. The power supply unit 5000 may include a battery 5100 and a conversion unit 5500.

The battery 5100 is a storage for storing a current, and may be a capacitor used for an existing PV system T or a capacitor for temporarily storing power transmitted from a power station. In other words, the battery 5100 may store a current generated from the solar panel P or may store a current sent from a power station.

According to an embodiment, when the switching unit 3000 to be described later is closed by the second control unit 7300 as described above, the reverse current discharged from the battery 5100 may be introduced to the solar panel P. At this time, an amount of the reverse current discharged from the battery 5100 may be smaller than an amount of the generated current of the solar panel P including the strings S ranging from the first row to the N-th row. Accordingly, the de-icing device for the solar panel according to an embodiment of the present invention may remove snow without a break-down of the circuit when the reverse current is introduced to the solar panel P.

When the reverse current discharged from the battery 5100 is an alternating current (AC), the conversion unit 5500 may change the AC to a direct current (DC) that can be introduced to the solar panel P.

Accordingly, according to an embodiment, when the reverse current discharged from the battery 5100 is the DC, the reverse current may flow in a direction A without passing through the conversion unit 5500.

According to another embodiment, when the reverse current discharged from the battery 5100 is the AC, the reverse current may flow in a direction B through the conversion unit 5500.

The control unit 7000 may control the operations of the sensor unit 1000, the switching unit 3000, and the power supply unit 5000. The control unit 7000 may include the first control unit 7100, the second control unit 7300, a third control unit 7500, and the fourth control unit 7700.

As described above, the first control unit 7100 may determine whether the data measured by the sensor unit 1000 satisfies threshold conditions.

The threshold conditions may be condition values of the sensor unit 1000 for determining whether snow is deposited. According to an embodiment, when the amount of the generated current of the solar panel P measured by the current sensor 1500 is equal to or larger than a first threshold value, the measurement data of the first and second temperature sensors 1110 and 1150 is a sub-zero value, and the measurement data of the illuminance sensor 1300 is a positive (+) value, the first control unit 7100 may determine that snow is deposited on the solar panel P. Thereafter, the switching unit 3000 is closed by the second control unit 7300 to be described later, so that the reverse current is introduced into the solar panel P to start de-icing.

When the measurement data of at least one of the first temperature sensor 1110, the second temperature sensor 1150, and the illuminance sensor 1300 does not satisfy the threshold conditions during de-icing, the second control unit 7300 to be described later may open the switching unit 3000 to stop de-icing.

In addition, the first control unit 7100 may adjust an amount of the reverse current discharged from the power supply unit 5000. More specifically, the first control unit 7100 may determine the amount of the reverse current discharged from the power supply unit 5000, according to the measurement data transmitted from the sensor unit 1000.

According to an embodiment, when the measurement data of the temperature sensor 1100 and the illuminance sensor 1300 satisfy the threshold conditions, the first control unit 7100 may determine the amount of the reverse current discharged from the power supply unit 5000 by the measurement data of the temperature sensor 1100 and the illuminance sensor 1300. However, a maximum value of the increased amount of the reverse current may be smaller than the amount of the generated current of the solar panel P as described above. Thus, the efficiency of de-icing for the solar panel P can be increased without a break-down of the circuit.

In the de-icing device for the solar panel according to an embodiment of the present invention, the amount of the reverse current of the power supply unit 5000 may be adjusted by the first control unit 7100, so that the high-precision and high-efficiency de-icing device for the solar panel may be provided.

The second control unit 7300 may control the opening and closing of the switching unit 3000 as described above.

As described above in the description of the switching unit 3000 with reference to FIG. 2, according to an embodiment, the second control unit 7300 may individually control the plurality of switching units 3000 connected to the respective strings, thereby performing partial de-icing for each area of the solar panel P.

As described above in the description of the switching unit 3000 with reference to FIG. 3, according to another embodiment, when the second control unit 7300 closes the first switch 3100 and the second switch 3500, power generation and de-icing of the solar panel P may be performed simultaneously. For example, when the reverse current is applied to the first line (Line 1) due to the closing of the first switch 3100 and the second switch 3500, de-icing may be performed in the even-numbered strings S to which the first line (Line 1) is connected, and solar power generation may be performed in the odd-numbered strings S to which the second line (Line 2) is connected.

In other words, by de-icing only with respect to the spaced strings S, the strings S positioned therebetween also obtain an indirect effect of the de-icing by the heat generated by the spaced strings S. Thus, when an amount of snowfall is small and no ice is formed, a high-efficiency de-icing effect can be expected with low power consumption.

Accordingly, the de-icing device for the solar panel according to an embodiment of the present invention may perform customized de-icing according to the purpose of a user by the second control unit 7300, thereby providing the high-efficiency de-icing device for the solar panel.

In addition, the de-icing device for the solar panel according to an embodiment of the present invention may perform automatic de-icing for the solar panel P by the first control unit 7100 and the second control unit 7300, thereby providing the high-performance de-icing device for the solar panel.

The third control unit 7500 may monitor the amount of the reverse current discharged from the power supply unit 5000 in real time. More specifically, the third control unit 7500 may control the opening and closing of the switching unit 3000 according to measurement data transmitted from the current sensor 1500.

According to an embodiment, when the measurement data of the current sensor 1500 exceeds the first threshold value, the third control unit 7500 may open the switching unit 3000 to block the flow of the reverse current into the solar panel P. Accordingly, the de-icing device for the solar panel according to an embodiment of the present invention may monitor the amount of the reverse current introduced into the solar panel P in real time, thereby preventing a breakdown of the circuit of the solar panel P due to excessive back electromotive force (EMF).

As described above in the description of the illuminance sensor 1300, the fourth control unit 7700 may be interlocked with the PV system T and may stop the PV system T when the measurement data value of the illuminance sensor 1300 is smaller than a second threshold value.

More specifically, when the measurement data value of the illuminance sensor 1300 is smaller than the second threshold value, the fourth control unit 7700 may determine that it is the sunset time point. Accordingly, the fourth control unit 7700 may transmit a stop signal to the PV system T to stop the PV system T, thereby providing the high-efficiency de-icing device.

The de-icing device for the solar panel according to an embodiment of the present invention has been described above. Hereinafter, a method of operating a de-icing device for a solar panel according to an embodiment of the present invention will be described in detail.

Figure 4:
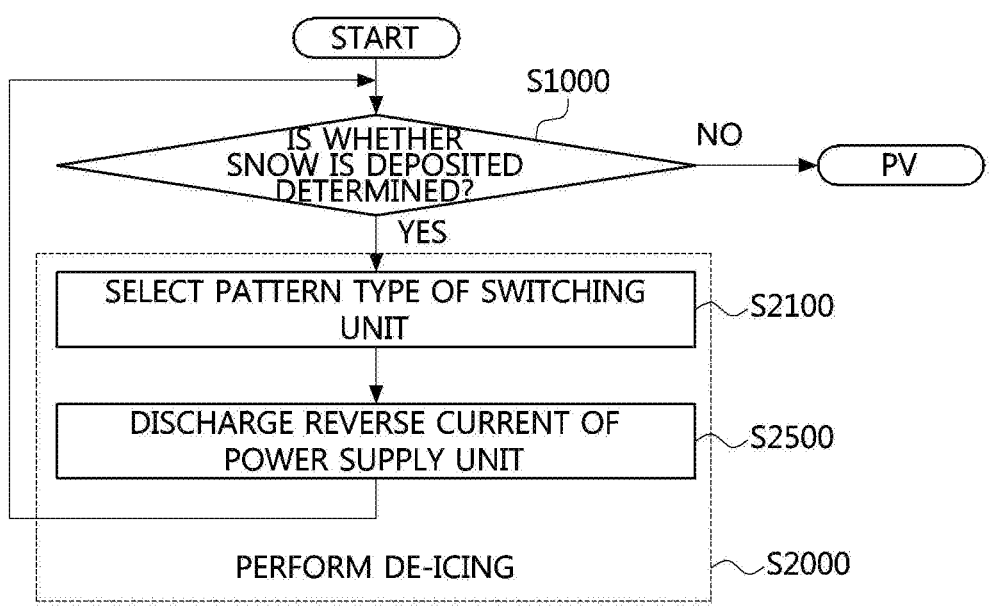
FIG. 4 is a flowchart illustrating a method of operating a de-icing device for a solar panel according to an embodiment of the present invention.

FIG. 4 is a flowchart illustrating a method of operating a de-icing device for a solar panel according to an embodiment of the present invention.

Referring to FIGS. 1 to 4, in operation S1000, the de-icing device for the solar panel may determine whether snow is deposited on the solar panel P. At this time, whether snow is deposited on the solar panel P may be determined by the sensor unit 1000. In other words, it may be first determined whether measurement data of the temperature sensor 1100, the illuminance sensor 1300, and the current sensor 1500 satisfies threshold conditions.

In operation S2000, when the measurement data satisfies the threshold conditions, the de-icing device for the solar panel may perform de-icing with respect to the solar panel. More specifically, in operation S2100, when the measurement data of the sensor unit 1000 satisfies the threshold conditions, the control type of the switching unit 3000 may be selected.

The control type of the switching unit 3000 may be executed by the second control unit 7300 according to a user's selection. More specifically, the second control unit 7300 may individually control the plurality of switching units 3000 connected to one end of each of the strings S according to the user's selection as in the embodiment with reference to FIG. 2, or may selectively control the first switch 3100 or the second switch 3500 connected to the first line (Line 1) or the second line (Line 2) as in the other embodiment with reference to FIG. 3.

In operation S2500, when the control type of the switching unit 3000 is determined by the second control unit 7300, the selected switching unit 3000 is closed so that a reverse current may be introduced into the solar panel P. Accordingly, de-icing of the solar panel P may be performed.

When the measurement data of the sensor unit 1000 does not satisfy the threshold conditions during the de-icing for the solar panel P in operation S1000, the de-icing for the solar panel P may be terminated. In other words, the operation of the de-icing device for the solar panel may be stopped.

When a signal is generated by the third control unit 7500 during the de-icing operation for the solar panel, the de-icing for the solar panel P may be terminated regardless of the operation step.

More specifically, when the measurement data of the current sensor 1500 that measures an amount of a generated current of the solar panel P is larger than the amount of the reverse current applied to the solar panel P including the strings ranging from a first row to an N-th row, the third control unit 7500 may generate a warning signal. When the warning signal is generated, the de-icing device for the solar panel may terminate the de-icing for the solar panel P regardless of the operation step. Thus, a break-down of the circuit may be prevented.

Thereafter, when the de-icing for the solar panel P is terminated, solar power generation (PV, photovoltaic) may be executed.

The characteristics of the de-icing device for the solar panel and the method of operating the same according to the embodiments of the present invention have been described above. The de-icing device for the solar panel and the method of operating the same according to the embodiments of the present invention may include the sensor unit 1000, the switching unit 3000, the power supply unit 5000, and the control unit 7000, by which it is possible to provide the high-efficiency de-icing device for the solar panel in which snow deposited on the solar penal P may be dissolved by applying the reverse current to the solar panel P.

In addition, it is possible to provide the high-efficiency, high-precision, and high-safety de-icing device for the solar panel in which solar power generation and de-icing may be simultaneously performed and the amount of the reverse current may be controlled.

As described above, the de-icing device for the solar panel according to an embodiment of the present invention and the method of operating the same may enable to automate de-icing for the solar panel based on threshold conditions by the sensor unit, thereby providing the high-performance de-icing device for the solar panel and the method of operating the same.

In addition, the de-icing device for the solar panel according to an embodiment of the present invention and the method of operating the same may simultaneously perform power generation and de-icing, thereby providing the high-efficiency de-icing device for the solar panel and the method of operating the same.

In addition, the de-icing device for the solar panel according to an embodiment of the present invention and the method of operating the same may control an amount of reverse current by the power supply unit, thereby providing the high-safety de-icing device for the solar panel that prevents break-down and the method of operating the same.

In addition, the de-icing device for the solar panel according to an embodiment of the present invention and the method of operating the same may perform customized de-icing according to the purpose of a user by the control unit, thereby providing the high-efficiency de-icing device for the solar panel and the method of operating the same.

While the example embodiments of the present invention and their advantages have been described in detail, it should be understood that various changes, substitutions and alterations may be made herein without departing from the scope of the invention.

What is claimed is:

1. A de-icing device for a solar panel which is used for a photovoltaic (PV) system and includes a plurality of strings ranging from a first row to an N-th row, the de-icing device comprising:
    a sensor unit that determines whether snow is deposited on the solar panel;
    a power supply unit that discharges a reverse current to the solar panel;
    a switching unit that is positioned between the solar panel and the power supply unit and controls application of the reverse current to the solar panel; and
    a control unit that controls opening and closing of the switching unit according to whether data measured by the sensor unit satisfies a threshold condition,
    wherein the sensor unit includes
    a temperature sensor that includes a first temperature sensor disposed in a periphery of the solar panel to measure an ambient atmospheric temperature and a second temperature sensor disposed on the solar panel to measure a temperature of the solar panel,
    an illuminance sensor that is disposed on the solar panel and determines a sunset time point according to an amount of light, and
    a current sensor that is connected to the power supply unit and measures an amount of a generated current of the solar panel in real time.

2. The de-icing device of claim 1, wherein the amount of the generated current of the solar panel is smaller than an amount of the reverse current that is discharged from the power supply unit and is introduced into the plurality of strings ranging from the first row to the N-throw.

3. The de-icing device of claim 1, wherein, when the amount of the generated current measured by the current sensor is equal to or larger than a first threshold value, the temperature measured by each of the first temperature sensor and the second temperature sensor is a sub-zero value, and data measured by the illuminance sensor is a positive (+) value, de-icing is performed.

4. The de-icing device of claim 1, wherein a plurality of switching units are provided and are respectively connected to one end of the plurality of strings.

5. The de-icing device of claim 1, wherein
    the switching unit includes a first switch and a second switch, and
    the second switch is connected to a contact between a first line in which the strings of even-numbered rows are grouped and a second line in which the strings of odd-numbered rows are grouped, and is positioned closer to the solar panel than the first switch.

6. The de-icing device of claim 5, wherein the first switch is an open/close type switch, and the second switch is a toggle type switch.

7. The de-icing device of claim 1, wherein the power supply unit further includes a battery that stores and discharges a current, and a conversion unit that converts, when the reverse current discharged from the battery is an alternating current (AC), the AC into a direct current (DC).

8. The de-icing device of claim 1, wherein the switching units connected to the plurality of strings ranging from the first row to the N-th row are sequentially operated in a forward direction or a reverse direction.

9. The de-icing device of claim 1, wherein the control unit includes
- a first control unit that determines whether the data measured by the sensor unit satisfies the threshold condition,
- a second control unit that controls the opening and closing of the switching unit,
- a third control unit that monitors the amount of the reverse current discharged from the power supply unit in real time, and
- a fourth control unit that stops the PV system when data measured by the illuminance sensor is less than a second threshold value.

10. The de-icing device of claim 9, wherein the first control unit adjusts an amount of the reverse current discharged from the power supply unit.

11. A method of operating a de-icing device for a solar panel which includes at least one sensor unit and removes snow deposited on the solar panel used for a PV system, the method of operating the de-icing device comprising:
- determining whether snow is deposited on the solar panel; and
- de-icing for the solar panel in response to the determining, when the snow is deposited on the solar panel,
- wherein the sensor unit includes
  - a temperature sensor that includes a first temperature sensor disposed in a periphery of the solar panel to measure an ambient atmospheric temperature and a second temperature sensor disposed on the solar panel to measure a temperature of the solar panel,
  - an illuminance sensor that is disposed on the solar panel and determines a sunset time point according to an amount of light, and
  - a current sensor that is connected to the power supply unit and measures an amount of a generated current of the solar panel in real time.

12. The method of operating the de-icing device of claim 11, wherein the solar panel includes a plurality of strings ranging from a first row to an N-th row.

13. The method of operating the de-icing device of claim 11, wherein the determining of whether snow is deposited on the solar panel includes determining whether snow is deposited on the solar panel according to whether data measured by the sensor unit satisfies a threshold condition.

14. The method of operating the de-icing device of claim 13, wherein the threshold condition is characterized that data measured by the current sensor is equal to or larger than a first threshold value, the temperature measured by each of the first temperature sensor and the second temperature sensor is a sub-zero value, and data measured by the illuminance sensor is a positive (+) value.

15. The method of operating the de-icing device of claim 14, wherein the performing of de-icing for the solar panel includes
- selecting, by a user, a control type of the switching unit when the data measured by the sensor unit satisfies the threshold condition, and
- discharging a reverse current according to the selected control type of the switching unit.

16. The method of operating the de-icing device of claim 15, wherein, when the amount of the generated current of the solar panel measured by the current sensor is larger than a sum of amounts of reverse currents respectively applied to a plurality of strings of the solar panel, de-icing for the solar panel is terminated regardless of a corresponding operation step.

* * * * *